Oct. 29, 1940.   D. BUCCICONE   2,219,622

THICKNESS GAUGE

Filed Jan. 3, 1939   3 Sheets-Sheet 1

Inventor:
DARIO BUCCICONE,
by: John E. Jackson
his Attorney.

Oct. 29, 1940.　　　　D. BUCCICONE　　　　2,219,622
THICKNESS GAUGE
Filed Jan. 3, 1939　　　3 Sheets-Sheet 2

Inventor:
DARIO BUCCICONE,
by: John E. Jackson
his Attorney.

Oct. 29, 1940.                    D. BUCCICONE                    2,219,622
                                THICKNESS GAUGE
                        Filed Jan. 3, 1939        3 Sheets-Sheet 3

Inventor:
DARIO BUCCICONE,
by John E. Jackson
his Attorney.

Patented Oct. 29, 1940

2,219,622

UNITED STATES PATENT OFFICE 2,219,622

THICKNESS GAUGE

Dario Buccicone, Gary, Ind.

Application January 3, 1939, Serial No. 249,104

11 Claims. (Cl. 33—147)

This invention relates to gauges and, particularly, to an improved automatic gauge for determining the thickness of metallic sheets and the like.

It is oftentimes desirable to provide a gauge having a large dial or other indicating means which can be accurately read at a considerable distance therefrom. Thickness gauges of various designs and constructions have been suggested and used for such a purpose but most of them have been unsatisfactory, in that a multiplicity of gears and levers usually were employed for amplifying and transmitting the thickness measured to an indicating dial or device. Such a gear and lever arrangement usually was quite complicated and expensive, and readily got out of adjustment. Also, such gauges were usually carelessly handled when used, thereby tending to damage the gears and levers thereof which resulted in errors in calibration.

Furthermore, in such gauges, it usually was necessary to force the material to be gauged into the gauge between and over the anvils or sensitive members which contact the opposed surfaces of the material and to slide the material thereover out of the gauge after it has been gauged which resulted in undue wear to these members and danger of errors in calibration.

According to the present invention, there is provided a thickness gauge in which all of the above disadvantages have been eliminated, and, at the same time, a gauge which is simple and inexpensive in its construction and operation, and so constructed that wear on the parts and maintenance thereof will be reduced to a minimum.

It is among the objects of the present invention to provide a thickness gauge which is normally inoperative when not in use.

It is another object of the invention to provide an improved thickness gauge which is normally inoperative but will be automatically placed in operation by the material to be gauged when it is properly positioned therein and automatically made inoperative by the material after the gauging thereof.

It is a further object of the invention to provide an improved thickness gauge having a minimum number of parts and in which the thickness measurement of the material gauged is accurate and readily amplified, and, at the same time, easily and directly recorded.

Various other objects and advantages of this invention will be more apparent in the course of the following specification and will be particularly pointed out in the appended claims.

In the accompanying drawings there is shown, for the purpose of illustration, one embodiment which my invention may assume in practice.

Figure 1:
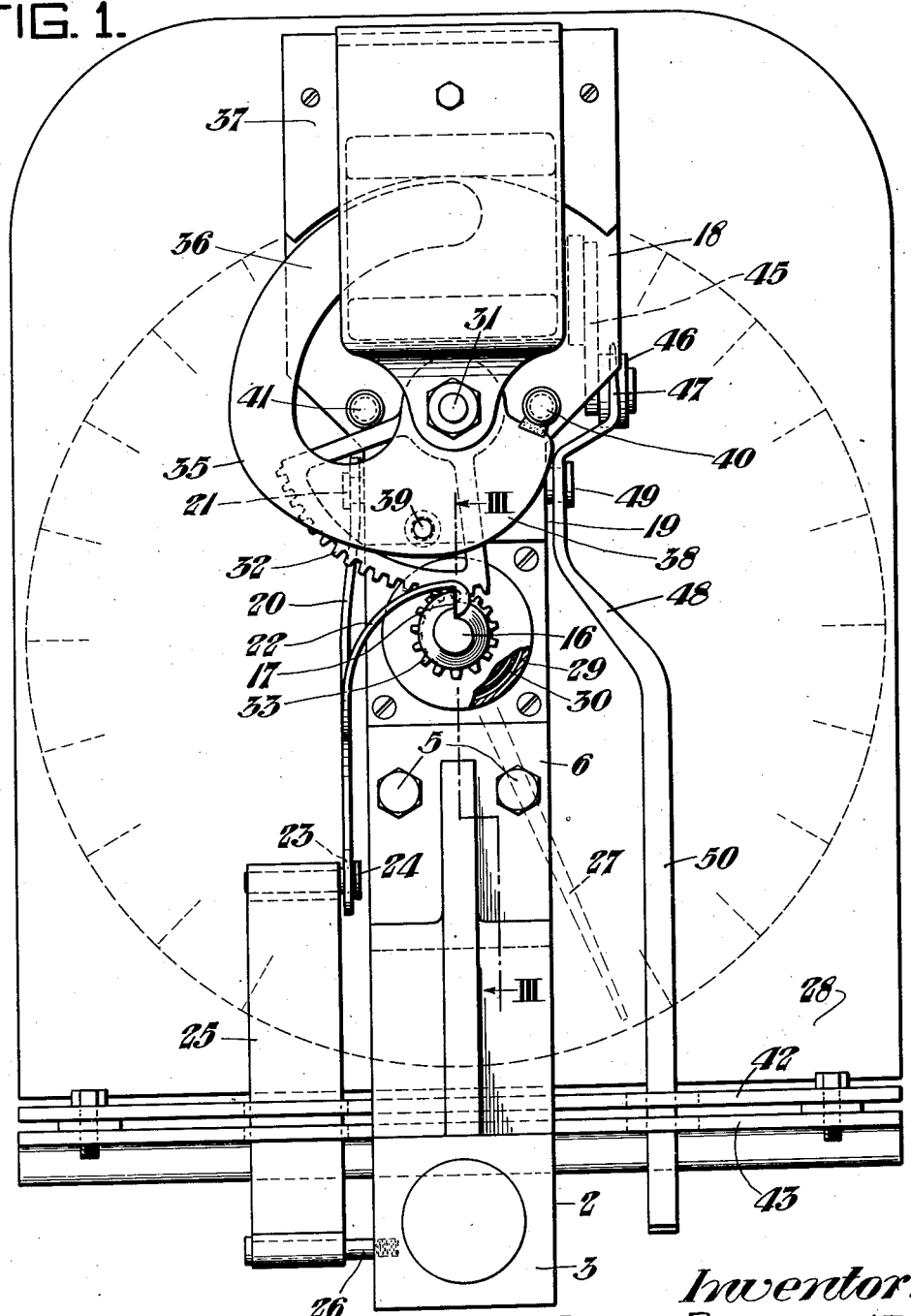
Figure 1 is a rear elevation of the improved automatic gauge of my invention.

Referring more particularly to the drawings, the improved thickness gauge of my invention comprises a yoke-shaped frame 2 having a base or lower arm 3 in which there is arranged a lower stationary anvil 4. The anvil 4 preferably has a hardened head portion and a lower threaded portion which is adapted to be arranged in a threaded hole in the base 3 so as to vertically adjust the anvil 4 therein. There is suitably mounted, preferably by means of bolts 5, on the outer end of the upper arm 6 of the frame 2, a housing 7 having a cam shaft 8 horizontally disposed therein with a cam member 9 arranged thereon and secured thereto, both of which are rotatably mounted on suitable bearings 10 positioned in the upper portion of the housing 7. The cam member 9 has arranged, on the periphery thereof, preferably a shoulder or stop portion 11.

Figure 4:
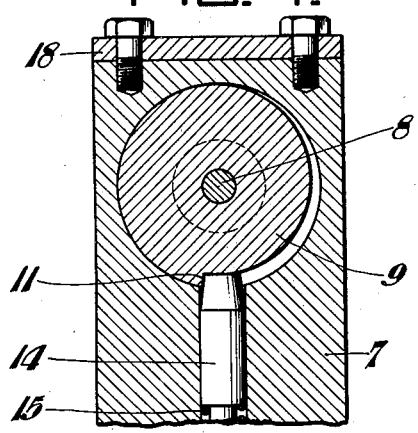
Figure 4 is a section taken on the line IV—IV of Figure 3.

In the lower part of the housing 7, there is arranged a plunger 12 having an upper anvil 13 arranged on the outer lower end thereof oppositely disposed from the anvil 4 and a cam follower 14 on the upper end thereof which is adapted to contact the cam 9 and against which the shoulder or stop 11 is adapted to be normally positioned, as shown in Figure 4. There is positioned preferably around the plunger 12, between the cam follower 14 and the lower inner end wall of the housing 7, a compression coil spring 15 which is adapted to keep the cam follower of the plunger 12 against the cam 9 at all times. There is disposed preferably in the housing 7, around the plunger 12 and the cam 9, a suitable lubricant which will keep the enclosed parts thereof at all times lubricated, thereby reducing the wear thereon to a minimum and tending to maintain accuracy in the gauge readings.

On the inner end of the cam shaft 8 there is securely mounted a knob 16 having a flange or offset portion 17, or other suitable catch arrangement, arranged on the periphery thereof. There is suitably mounted on top of the housing 7 an upwardly extending bracket 18 having a bearing portion 19 thereon to which one end of a downwardly extending trigger arm 20 is pivotally attached by means of a pin 21, to one side thereof. The arm 20 has arranged therewith an inwardly extending hooked trigger portion 22, the end of which is adapted to cooperate with and normally engage the flanged portion 17 of the knob 16. The lower end of the arm 20 has a slotted hole 23 arranged therein for pivotally receiving a pin 24 carried by the upper end of an actuating arm 25 which has its lower end pivotally attached to the base or lower anvil arm 3 by means of a pin 26 and is adapted to extend to a position in the path the material to be gauged takes as it is positioned in the gauge.

On the other end of the cam shaft 8 there is arranged a pointer 27 in front of an enlarged graduated indicating dial 28 which is suitably mounted preferably on the outer face of the housing 7 and with which the pointer 27 is adapted to cooperate to indicate thereon the thickness of the material gauged. There is disposed, preferably in a housing 29 located adjacent the inner end of the housing 7 and around the cam shaft 8 and cam member 9 to which it is securely attached, a helical spring 30. This spring is normally loaded and it is the purpose of this spring to rotate the cam shaft 8, together with the cam 9 carried thereby when the trigger 22 is moved out of engagement with the knob 16, so that the cam 9 will move to force the plunger 12 outwardly toward the lower anvil 4 to position the upper anvil 13 against the material to be gauged.

There is suitably arranged on the bracket 18, on top of the housing 7, a stub-shaft 31 having a gear segment 32 loosely pivoted thereon which is adapted to mesh with a pinion gear 33 securely arranged on the cam shaft 8. There is also pivotally arranged on the stub-shaft 31, an arcuated rocking member 35 having a solenoid armature portion 36 associated therewith which is adapted to cooperate with a solenoid 37 suitably arranged adjacent the top of the bracket 18 above the stub-shaft 31. The rocking member 35 has preferably a weighted bottom portion 38 which is adapted to act as a counter-balance for the solenoid armature portion 36 and has arranged thereon an inwardly extending pin 39, preferably rubber covered, which is adapted to extend into an opening between the arms of the gear segment 32 and cooperate therewith to actuate the same, as will be described later in the specification. There is also arranged on one side of the bracket 18, a stop member or pin 40 against which the rocking member 35 is adapted to normally rest, and a stop pin 41 on the opposite side of the bracket against which the gear segment 32 is adapted to normally rest, as shown in Figure 1, both of which are preferably rubber covered so as to absorb any shock to the gauging device.

There is suitably mounted, preferably on the base or lower arm 3, spaced apart guide members 42 and 43. These guide members preferably have outwardly flared ends which, of course, aid in properly guiding the material to be gauged therebetween. There is also mounted on the bracket 18, preferably on the front side thereof, a limit switch 44 which is adapted to control the energization of the solenoid 37. This switch has a downwardly extending arm 45 carried thereby with preferably a roller 46 arranged thereon which is adapted to cooperate with the upper offset end portion 47 of an arm 48. The arm 48 is pivotally attached to the portion 19 of the bracket 18 adjacent its upper end by means of a pin 49 securely arranged in the bearing portion 19 on the opposite side thereof from the pin 21. The arm 48 has a downwardly extending offset portion 50 which extends downwardly through the guide members 42 and 43 to a position the material takes when it is positioned in the gauge, and on the opposite side of the gauge from that of the arm 25, which also extends through the guide members 42 and 43 at a point preferably slightly forwardly from that of the offset portion 50 of the arm 48, as is clearly shown in Figures 5 and 6 of the drawings.

Figure 2:
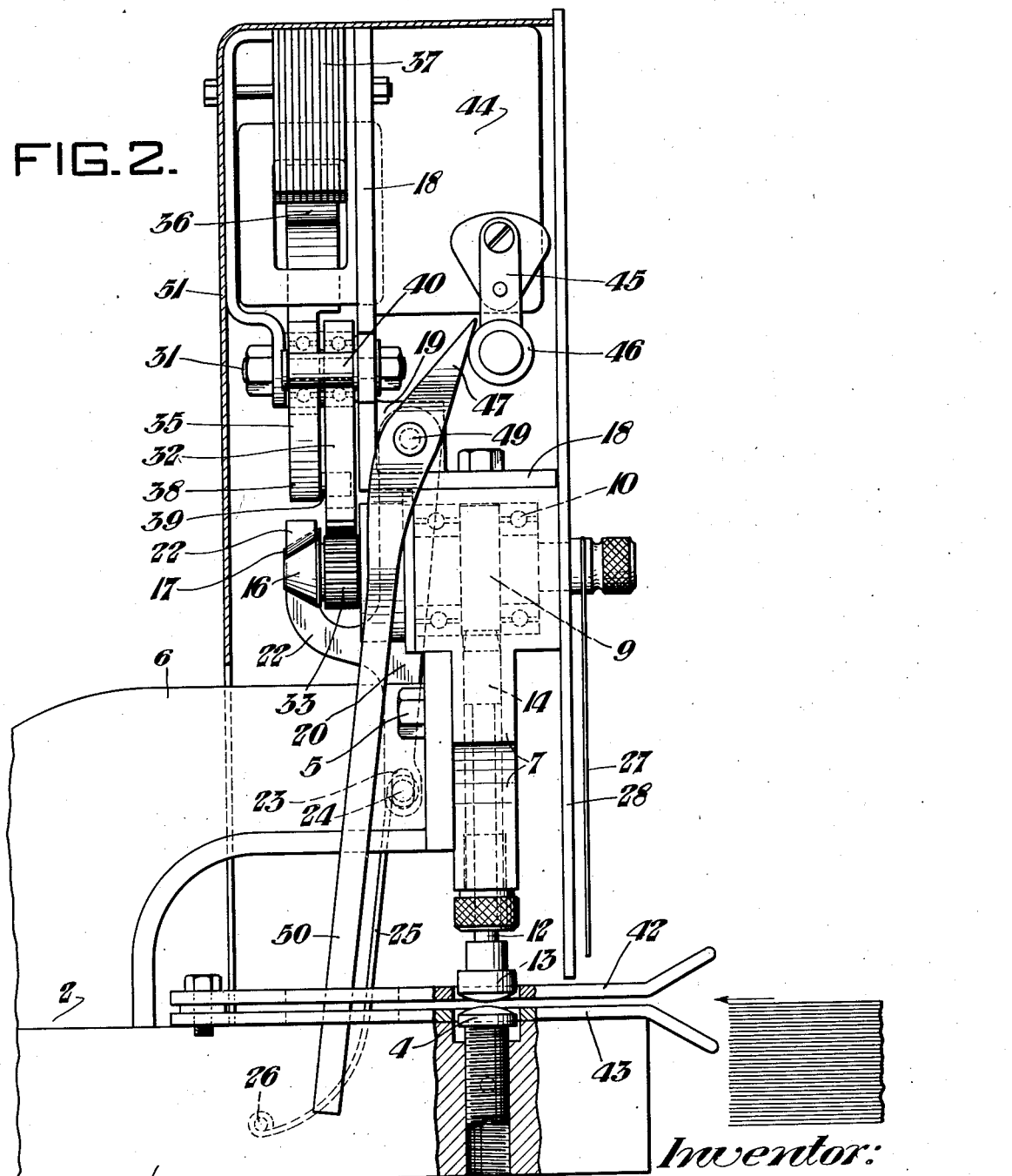
Figure 2 is a side view thereof, partly in section.
Figure 3:
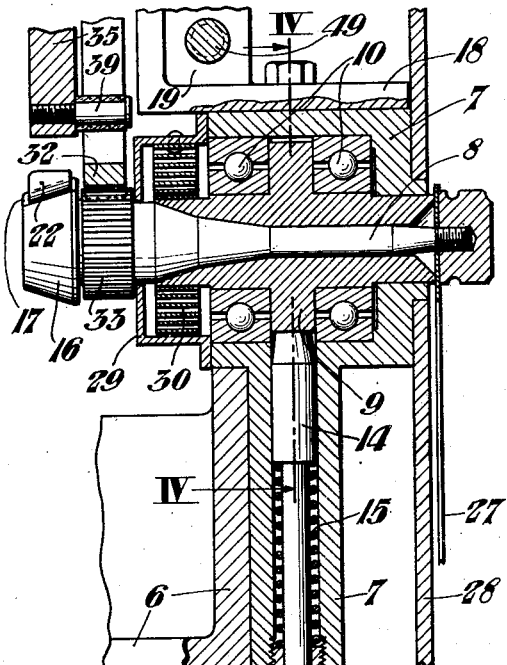
Figure 3 is a section taken on the line III—III of Figure 1.
Figure 5:
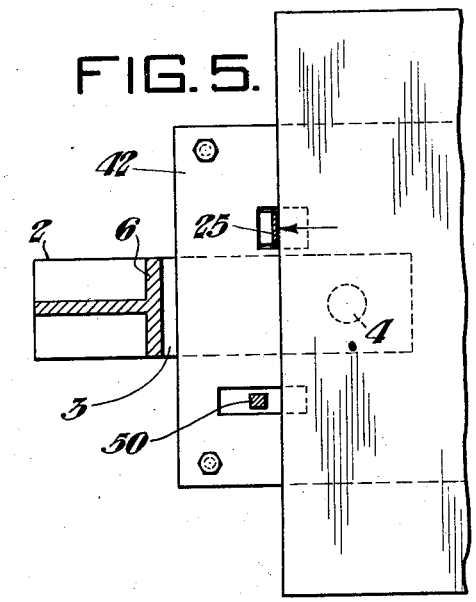
Figure 5 is a plan showing the position that the sheet of material to be gauged assumes during the gauging thereof; and, Figure 6 is a similar view showing the position the sheet of material to be gauged would assume after the gauging operation when it is desired to move the sheet from the gauge.

It will be understood that the plunger 12, together with the anvil 13 carried thereby, is normally held in a retracted position, as shown in Figure 2, so as to space the upper movable anvil 13 from the lower stationary anvil 4. The metallic sheet or the material to be gauged is inserted between the guides 42 and 43 and moved into the gauge until the back edge thereof contacts the actuating arm 25 and moves this arm rearwardly, as shown in Figure 5. The movement of this actuating arm by the material also moves the arm 20 to which it is pivotally connected together with the trigger 22 carried thereby from engagement with the knob 16, thereby permitting the cam shaft 8 to be rotated, due to the action of the loaded spiral spring 30, in such a manner that the cam 9 acts against the cam follower 14 on the end of the plunger 12 so as to force the plunger, together with the upper anvil 13 carried thereby, downwardly against the action of the coil spring 15, positioning the anvil 13 against the top surface of the material being gauged, as shown in Figure 3. As the cam shaft 8 rotates, the pinion gear 33 carried thereby causes the gear segment 32 also to rotate, positioning it against the stop 40 when the pointer reaches the calibration indicating zero thickness. The movement of the cam shaft 8 also moves, of course, the pointer 27 carried thereby and when the anvil 13 comes to rest against the top of the sheet, the pointer is positioned opposite the calibration on the indicating dial which, in turn, indicates the thickness of the material.

Figure 6:
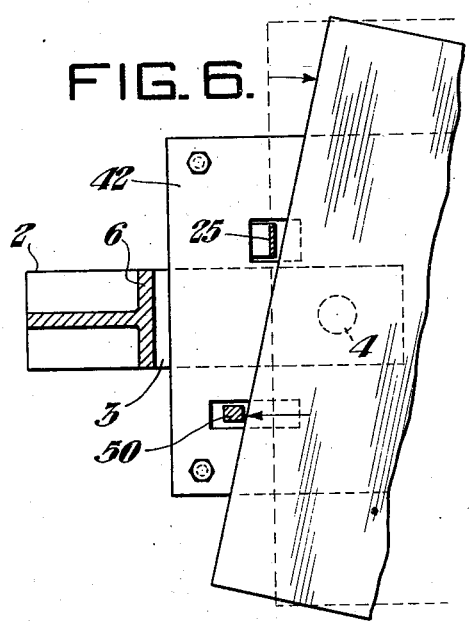

After the reading on the indicating dial is noted, the sheet is twisted or turned in the gauge in a clockwise direction so as to be moved away from the arm 25, as shown in Figure 6, thereby permitting the arm 25 to return to its normal position due to the weight of the lower portion of the arm 20, and moved against the downwardly extending offset portion 50 of the arm 48. Such movement causes the arm then to pivot about the pin 49, thereby actuating the arm 45 of the switch 44 to close the same, thereby energizing the solenoid 37 which, in turn, draws the piston 36 into the solenoid, rotating the solenoid plunger 35. As the solenoid plunger rotates, the pin 39 carried thereby engages and also rotates the segmental gear 32 in the same direction to position it against the stop 41, as shown in Figure 1, thereby rotating the gear 33 with which it is meshed and the cam shaft 8 to which the gear is attached and the cam 9, so as to position the flange or stop 11 carried thereby against the cam follower 14, permitting the plunger 12 together with the anvil carried thereby to move upwardly, due to the action of the spring 15, to its retracted or normal position, as shown in Figure 2, and, at the same time, loading the spiral spring 30. As the cam shaft 8 rotates, the knob 16 carried thereby, of course, also moves and the trigger 22 engages the flange 17 on the knob to lock the shaft and cam in their original and normal positions with the two anvils spaced apart ready to gauge the next sheet of material. The sheet or material gauged is then removed from the gauge. As the sheet is removed from the gauge, the lever 48 pivots about the pin and moves forwardly to its normal position, due to its weight, thereby opening the switch 44 and deenergizing the solenoid 37. The solenoid plunger 35 then drops back to its normal position against the stop 40, as shown in Figure 1, due to its heavy bottom portion 38 which acts as a counter-balance therefor. The succeeding sheets to be gauged are then positioned in the gauge and manipulated therein, as above described. The entire mechanism is preferably enclosed by an outer housing or cover 51, suitably arranged therearound.

As a result of my invention, it will be seen that the gauging anvils are normally spaced apart and that the gauge is normally inoperative and is automatically put into operation as soon as the sheet or material to be gauged is positioned and manipulated therein. It will be understood that the cam 9 is calibrated in such a manner relative to the enlarged indicating dial 25 that the reading is greatly amplified, and can be easily and accurately read at a reasonable distance therefrom.

While I have shown and described one embodiment of my invention, it will be understood that this embodiment is merely for the purpose of illustration and description and that various other forms may be devised within the scope of my invention, as defined in the appended claims.

I claim:

1. A gauge for determining the thickness of material comprising a pair of oppositely disposed material contacting members with at least one of said contacting members being movable relative to the other, means for holding said movable contacting member normally in a retracted position at a spaced distance from the other of said contacting members, means with which the material to be gauged is adapted to engage when placed and moved to one position between said contacting member, means for actuating said movable contacting member so as to move the same toward the opposite member against the material being gauged, said actuating means being controlled by said material engaging means, a second means with which the material is adapted to engage when moved to another position between the contacting member, means for returning said movable contacting member to its retracted position, said last mentioned means being controlled by said second material engaging means, and means associated with said movable contacting member for determining the thickness of the material.

2. A gauge for determining the thickness of material comprising an indicating dial, a plunger having an anvil on the outer free end thereof, a stationary anvil oppositely disposed from the anvil on said plunger, a rotatable cam member against which the inner opposite end of said plunger is adapted to contact, said cam member being associated with said indicating dial, means for retaining the plunger against said cam, means for positioning the cam so that said plunger which cooperates therewith will normally assume a retracted position whereby the anvils are normally spaced apart, means for rotating said cam so as to move the plunger together with the anvil carried thereby outwardly toward the stationary anvil against the material being gauged, means with which the material engages for controlling said cam rotating means, said last mentioned means being actuated by the material to be gauged when the same is positioned in the gauge between the anvils, and means for rotating the cam so that said plunger toether with the anvil carried thereby moves inwardly to its retracted position away from the stationary anvil after the material has been gauged.

3. A gauge for determining the thickness of material comprising a graduated dial, a rotatable shaft associated with said dial, a pointer arm carried by said shaft cooperating with said dial to indicate thereon the thickness of material, a cam member carried by said shaft, a plunger having an anvil member arranged on the outer free end thereof with the inner end of said plunger being disposed against said cam member, means for retaining said plunger against said cam, a stationary anvil member oppositely disposed from the anvil carried by the plunger, means for retaining said shaft together with the cam member carried thereby so that said plunger with which it cooperates will normally assume a retracted position with the anvil carried thereby spaced from the stationary anvil, means for rotating said shaft together with said cam so that the same will move the plunger outwardly together with the anvil carried thereby toward the stationary anvil and against the material to be gauged, and means for rotating said shaft together with the cam carried thereby so that said plunger together with the anvil carried thereby will return to its retracted position after the material has been gauged.

4. A gauge for determining the thickness of material comprising an enlarged indicating dial, a shaft associated with said dial, a pointer arm carried by said shaft cooperating with said dial to indicate thereon the thickness of material, a cam member securely arranged on said shaft, a plunger arranged adjacent said cam member with which it is adapted to cooperate, said plunger having an anvil on the outer free end thereof, a stationary anvil oppositely disposed from the anvil on said plunger, a spring for retaining said plunger at all times in contact with said cam, means associated with said shaft for positioning and retaining the same together with the cam carried thereby so that said plunger which cooperates therewith will normally assume a retracted position with the anvil carried thereby normally spaced from the stationary anvil, resilient means which is normally loaded for rotating said shaft together with the cam carried thereby, means for releasing said resilient means so that said cam will force said plunger outwardly together with the anvil carried thereby toward the stationary anvil and against the surface of the material to be gauged, means with which the material engages when positioned in said gauge for actuating said last mentioned means, and a second means with which the material engages for actuating means for rotating said shaft together with the cam carried thereby for returning said cam to its initial position after the material has been gauged whereby the plunger together with the anvil carried thereby will move to its retracted normal position away from said stationary anvil and the material in the gauge.

5. A gauge of the combination as defined in in claim 4 wherein the means associated with the shaft for positioning and retaining the same together with the cam carried thereby so that the plunger which cooperates therewith will normally assume a retracted position comprises an annular notched member securely arranged on said shaft, a latch member cooperating with the notch in said member to lock the shaft and the cam member carried thereby in position against rotation, and a lever with which the material engages when properly positioned in the gauge which actuates said latch releasing the same thereby permitting the shaft and cam to rotate due to the action of the loaded resilient means whereby the plunger together with the anvil carried thereby are moved outwardly toward the opposed anvil against the material to be gauged by the cam.

6. A gauge of the combination as defined in claim 4 wherein the means for returning the cam member to its initial position comprises a pinion gear arranged on the shaft, a gear segment with which said gear is adapted to cooperate, a solenoid, said solenoid plunger adapted to actuate said gear segment so as to rotate said shaft together with the cam carried thereby to move the same to its initial predetermined position, a switch for controlling the energization of said solenoid to move said plunger, and means with which the material engages when positioned in the gauge for actuating said switch.

7. A gauge comprising a normally fixed anvil, a movable anvil, means for retaining stored energy tending to move the latter anvil towards the former, means for normally restraining said last mentioned means, and means with which the material to be gauged cooperates when the same is positioned in said gauge for actuating said restraining means so as to release said stored energy means.

8. A gauge comprising a normally fixed anvil, a movable anvil, means for retaining stored energy tending to move the latter anvil toward the former, means for normally restraining said last mentioned means, means with which the material to be gauged cooperates when the same is positioned in said gauge for actuating said restraining means so as to release said stored energy means, and means for introducing a source of power so as to restore the energy in said stored energy means after the operation thereof.

9. A gauge comprising a normally fixed anvil, a movable anvil, means for retaining stored energy tending to move the latter anvil toward the former, means for normally restraining said last mentioned means, means with which the material to be gauged cooperates when the same is positioned in said gauge for actuating said restraining means so as to release said stored energy means, power means operative to restore the energy in said stored energy means, and another means with which the material cooperates when moved to a predetermined position in said gauge which actuates said power means.

10. A gauge for determining the thickness of material comprising a pair of oppositely disposed material contacting members with at least one of said contacting members being movable relative to the other, means for holding said movable contacting member normally in a retracted position at a spaced distance from the other of said contacting members, means with which the material to be gauged is adapted to engage when placed between said contacting members, and means for actuating said movable contacting member so as to move the same toward the opposed contacting member and against the material being gauged, said actuating means being controlled by said material engaging means.

11. A gauge for determining the thickness of material comprising an indicating dial, a rotatable shaft arranged substantially perpendicular to said dial, a pointer arm securely arranged on said shaft and cooperating with said dial to indicate thereon the thickness of the material, a cam member securely arranged on said shaft, a movable material contacting member arranged opposite said cam member with which it cooperates, a stationary material contacting member arranged opposite said movable contacting member, means for retaining said movable material contacting member against said cam, means for holding the shaft so that the cam carried thereby will position the movable contacting member with which it cooperates normally in a retracted position at a spaced distance from said stationary contacting means, means for rotating said shaft so that the cam carried thereby will move said movable contacting member toward said stationary contacting member against the material being gauged, and means for rotating said shaft together with the cam carried thereby so that the movable contacting member will return to its normal retracted position after the thickness of the material has been determined.

DARIO BUCCICONE.